United States Patent
Bank et al.

(10) Patent No.: US 10,927,007 B2
(45) Date of Patent: Feb. 23, 2021

(54) METHOD AND PLANT FOR THE PRODUCTION OF SYNTHESIS GAS

(71) Applicant: Deutsche Lufthansa AG, Cologne (DE)

(72) Inventors: Rolf Bank, Deggendorf (DE); Christian Schuhbauer, Hunderdorf (DE); Franz Leher, Winzer (DE)

(73) Assignee: CAPHENIA GMBH, Bernau (DE)

(*) Notice: Subject to any disclaimer, the term of this patent is extended or adjusted under 35 U.S.C. 154(b) by 666 days.

(21) Appl. No.: 15/522,775

(22) PCT Filed: Oct. 28, 2015

(86) PCT No.: PCT/EP2015/075039
§ 371 (c)(1),
(2) Date: Aug. 25, 2017

(87) PCT Pub. No.: WO2016/066716
PCT Pub. Date: May 6, 2016

(65) Prior Publication Data
US 2017/0349434 A1    Dec. 7, 2017

(30) Foreign Application Priority Data
Oct. 31, 2014  (DE) ............... 10 2014 015 966.3

(51) Int. Cl.
*C01B 3/24* (2006.01)

(52) U.S. Cl.
CPC ........ *C01B 3/24* (2013.01); *C01B 2203/0272* (2013.01); *C01B 2203/0861* (2013.01);
(Continued)

(58) Field of Classification Search
CPC .... C01B 2203/0272; C01B 2203/0861; C01B 3/24; C10J 2300/094; C10J 2300/0969;
(Continued)

(56) References Cited

U.S. PATENT DOCUMENTS 2,566,936 A  9/1951  Garrison
3,479,143 A * 11/1969  Kelsall ................... B01J 8/067
                                                                    422/659
(Continued)

FOREIGN PATENT DOCUMENTS

AT      396366 B    8/1993
DE   2413558 A1   10/1974
(Continued)

*Primary Examiner* — Anthony J Zimmer
*Assistant Examiner* — Syed T Iqbal
(74) *Attorney, Agent, or Firm* — Leydig, Voit & Mayer Ltd.

(57) ABSTRACT

A method for producing syngas includes a) splitting a hydrocarbon into carbon and hydrogen using a plasma to obtain a first product including carbon and hydrogen, b) mixing steam and carbon dioxide with at least a portion of the first product to produce a product stream, wherein a first portion of the carbon in the first product is converted in an endothermic reaction with steam to carbon monoxide and hydrogen and a second portion of the carbon in the first product is converted in another endothermic reaction with the carbon dioxide to carbon monoxide, and wherein heat is supplied to the endothermic reaction, and c) quenching the product stream of step b).

10 Claims, 5 Drawing Sheets

(52) U.S. Cl.
CPC .. *C10J 2300/094* (2013.01); *C10J 2300/0969* (2013.01); *C10J 2300/0973* (2013.01); *Y02P 20/582* (2015.11)

(58) Field of Classification Search
CPC ............... C10J 2300/0973; C10J 3/00; C10J 2300/0976; Y02P 20/582
See application file for complete search history.

(56) References Cited

U.S. PATENT DOCUMENTS

| | | | |
|---|---|---|---|
| 5,481,080 | A | 1/1996 | Lynum et al. |
| 5,486,674 | A | 1/1996 | Lynum et al. |
| 5,520,037 | A | 5/1996 | Soergel |
| 5,989,512 | A | 11/1999 | Lynum et al. |
| 2009/0064581 | A1 | 3/2009 | Nielsen et al. |
| 2010/0311847 | A1 | 12/2010 | Kowoll |
| 2014/0239232 | A1 | 8/2014 | Staton et al. |
| 2014/0364516 | A1* | 12/2014 | Kuhl ............... C01B 32/40 518/704 |
| 2015/0291433 | A1* | 10/2015 | Kuhl ............... C01B 3/24 518/702 |
| 2016/0089654 | A1 | 3/2016 | Kuhl |
| 2016/0340195 | A1 | 11/2016 | Kuhl |

FOREIGN PATENT DOCUMENTS

| | | | | |
|---|---|---|---|---|
| DE | 69319621 | T2 | 12/1999 | |
| DE | 102007046260 | A1 | 4/2009 | |
| DE | 102012010542 | A1 | 6/2013 | |
| DE | 102012015314 | A1 | 6/2013 | |
| EP | 0219163 | A2 * | 4/1987 | ............... C10J 3/12 |
| EP | 0219163 | A2 | 4/1987 | |
| EP | 0616559 | A1 | 9/1994 | |
| EP | 0616753 | A1 | 9/1994 | |
| EP | 0616754 | A1 | 9/1994 | |
| EP | 0635043 | A1 | 1/1995 | |
| GB | 2499604 | A | 8/2013 | |
| WO | WO 2013091878 | A1 | 6/2013 | |
| WO | WO 2013091879 | A1 | 6/2013 | |
| WO | WO 2015173352 | A1 | 11/2015 | |

\* cited by examiner

METHOD AND PLANT FOR THE PRODUCTION OF SYNTHESIS GAS

CROSS REFERENCE TO RELATED APPLICATIONS

This application is a U.S. National Stage Application under 35 U.S.C. § 371 of International Application No. PCT/EP2015/075039 filed on Oct. 28, 2015, and claims benefit to German Patent Application No. DE 10 2014 015 966.3 filed on Oct. 31, 2014. The International Application was published in German on May 6, 2016 as WO 2016/066716 A1 under PCT Article 21(2).

FIELD

The invention relates to a method and a plant for producing syngas from hydrocarbons, carbon dioxide, and water using a plasma.

BACKGROUND

A syngas refers to an industrially produced gas mixture consisting of the main components carbon monoxide and hydrogen. In widely-used methods for producing syngas, a starting substance containing carbon or hydrocarbon (HC), which can be in solid, liquid, or gaseous form, is reacted with water, carbon dioxide, or an oxidizing agent. The amounts of heat required for this are supplied to the process e.g. by combustion heat or by a plasma.

U.S. Pat. No. 2,566,936 A discloses a discontinuous process for producing a syngas. In a first process step, a preheated hydrocarbon gas is brought into contact with a fireproof material present in a reactor, which is heated to a temperature at which the hydrocarbon gas is split. Taking the example of methane as a hydrocarbon, the reaction equation is as follows:

$$CH_4 \rightarrow C + 2H_2 + 74.9 \text{ kJ/mol} \tag{1}$$

The solid carbon is deposited on the fireproof material, and the hydrogen is temporarily stored together with a small amount of unreacted methane. In a second process step, the carbon deposited on the fireproof material is brought into contact with a gas mixture composed of steam, methane and recycled waste gas containing CO, $H_2$, $CO_2$ and methane. At the still relatively high temperatures, steam reforming, in which methane reacts with the steam, first takes place:

$$CH_4 + H_2O \rightarrow CO + 3H_2 + 206.2 \text{ kJ/mol} \tag{2}$$

The following reactions take place at lower temperatures as the input gases absorb the heat, including the heterogeneous water-gas shift reaction, also abbreviated as the heterogeneous WGS reaction:

$$C + H_2O \rightarrow CO + H_2 + 131.3 \text{ kJ/mol} \tag{3}$$

The carbon further reacts in the so-called Boudouard reaction with the carbon dioxide:

$$C + CO_2 \rightarrow 2CO + 172.5 \text{ kJ/mol} \tag{4}$$

The composition of the syngas produced in reactions (2) through (4) can be adjusted by means of the proportions of the educt components to a preferred ratio of $H_2$ to CO of approximately 2:1. The syngas is fed to a synthesis reactor via an intermediate storage unit. In a final process step, the fireproof material in the reactor is brought back to the initial temperature by combustion reactions of the hydrogen, residual gas from the synthesis reactor, additional methane, and air stored in the first process step.

EP 0219163 A2 discloses a method using the heterogeneous WGS reaction. In this case, the method is carried out in a fixed-bed reactor of a simpler design in which the flow directions are reversed multiple times while changing the composition of the inflowing gases. Alternatively, continuous operation with a sliding bed reactor is also disclosed, in which the fireproof solids are discharged from the bottom of the reactor and then recycled into the top of the reactor.

A further method for the continuous production of syngas is known from DE 2413558 A, but in this case, the HC added as a carbon source is not split, but directly reacted with carbon dioxide and steam using a plasma torch as a heat source. The syngas is used as a reduction gas that is preferably intended for metallurgic processes and for use as a protective gas or carburizing gas. In this case, the reduction gas is preferably circulated. It reduces iron oxides while forming carbon dioxide and water. After this, hydrocarbons are fed into the circuit, which again react in the plasma torch and in a subsequent mixing chamber with the previously produced carbon dioxide and water to form reduction gas. Taking propylene as an example of a hydrocarbon, the reaction equations are as follows:

$$3CO_2 + C_3H_6 \rightarrow 6CO + 3H_2 \tag{5}$$

$$3H_2O + C_3H_6 \rightarrow 3CO + 6H_2 \tag{6}$$

The use of plasma torches in processes for producing syngas is further known from GB 2499604 A. The method relates to a plasma-supported gasification method for communal wastes. In a first step, the starting material is thermally treated in a gasifier, thus producing a syngas. In a second step, the syngas produced in the first step is treated with a plasma in the presence of carbon dioxide. This eliminates particulate components generated by gasification and other foreign matter. The carbon dioxide can be added in the first or the second step. The result is a processed syngas. The gasification and the plasma treatment can be carried out in the presence of additional carbon dioxide, oxygen, and steam. Carbon dioxide is added as an inert gas in order to control the reaction conditions, as carbon dioxide is exchanged for a portion of oxygen/steam. The object is to obtain a syngas with the highest possible energy content and a minimum of impurities. It can be subjected to a WGS reaction in order to produce carbon dioxide. Atomized water with a temperature of less than 100° C. is sprayed into the plasma treatment unit. This cools the syngas produced in the plasma unit, specifically because of the endothermic reaction of the water with carbon while producing hydrogen and carbon monoxide. The carbon dioxide contained in the process gas is captured and recycled into the process as circulating gas.

AT 396366B presents a method for producing a syngas using a plasma generator. In this case, a starting substance containing carbon and/or a hydrocarbon, as well as an oxidizing agent, carbon dioxide, and water is simultaneously fed together with air heated in a plasma generator into a reduction chamber in which the HC is decomposed, with the content of $CO_2$ and $H_2O$ in the process gas being a maximum of 5%. The process gas is then fed through a limestone or dolomite filling in which sulfur is removed, residual HC is decomposed, and a reaction with the oxidizing agent is achieved.

US 2009/0064581 A1 discloses a plasma-supported gasification plant for communal wastes with a three-zone reactor. The gasification method used here is generally an exothermic thermochemical process in which at high temperatures, carbonaceous fuels such as coal or biomass are converted by incomplete combustion and reduction into a syngas composed primarily of carbon monoxide, hydrogen, methane, and inert gases. The plasma torches used in US 2009/0064581 A1 are arranged in the middle and in the final third zone and can be operated by means of steam, carbon dioxide, etc., with these substances reacting directly with the waste to form syngas. The syngas is then cooled to about 800° C. in a quenching unit, then cooled to about 110° C. in a heat recovery unit, and finally cooled in a third and last stage to about 50° C. in a gas scrubber. The gasification plant is a variant of known steam reforming in which the carbonaceous energy sources are converted into syngas under the effect of steam, as described for example in reaction equation (2) above. In the presented method, the plasma torches used serve exclusively to provide reaction heat to the carbonaceous waste products to be gasified, with a simultaneous supply of oxygen, oxygen-enriched air, steam, or carbon dioxide. Splitting of hydrocarbons in the plasma torches is not provided.

US 2014/0239232 A1 relates to a similar gasification system. The system here is a pyrolysis unit for hydrocarbons based on a plurality of plasma torches for producing syngas. The required reaction heat is supplied by a plurality of plasma torches with carbon dioxide, steam, oxygen and/or recycled syngas as the plasma gas. The volume flows fed in by the plasma torches are regulated by means of a regulating system. An educt gas mixture is supplied to the pyrolysis unit at a plurality of separate supply sites, said mixture being composed of gaseous, liquid, or solid carbonaceous substances and optionally also containing carbon dioxide, steam, or water. The volume flows and the composition of the educts are also regulated in order to ensure an optimum syngas composition for the subsequent syngas-to-liquid process. The syngas is supplied to a cyclone, cooling, and filtering unit. Details of the syngas cooling will not be discussed here.

It can be seen from the documents mentioned above that plasma torches are primarily used as means for thermal input in endothermic reactions for gasification reactions, pyrolysis reactions, and in syngas purification. In this case, hydrocarbons and/or hydrocarbon-containing raw materials are split, which directly react in a close temporal or spatial connection with added steam, carbon dioxide, oxygen and/or recycled syngas to form syngas.

The production of syngas under use of spatially and/or temporally separate process steps, in which hydrocarbons are first split into carbon and hydrogen as intermediate products, is known for example from the above-mentioned documents U.S. Pat. No. 2,566,936A or EP 0219163A2. The amounts of heat required for this purpose are provided by means of combustion processes.

In the Kvaerner method, in contrast, hydrocarbons are split in a plasma torch at about 1600° C. into pure carbon and hydrogen according to the above reaction equation (1). DE 69319621 T2 presents possible embodiments of this method. Compared to other methods, the major advantage is that pure carbon is produced instead of carbon dioxide, and the high energy content of the products and the high temperature of the superheated steam also produced yield an efficacy of virtually 100%, with this efficacy being attributable to about 48% to the hydrogen, about 40% to the carbon, and 10% to the superheated steam. A further advantage is that in addition to the primary energy source, only a coolant and electricity are required. No byproducts or harmful substances requiring post-treatment are produced. The required electrical energy can be provided by the partial conversion to electricity of the products, and the energy contained in the superheated steam can be used to heat the HC used.

A further reactor with plasma-supported splitting of HC is known from EP 0616559 A1. Plasma torches usable for this purpose are described in EP 0616753 A1 or EP 0616754 A1. The electrode consumption occurring in this case can be reduced using to a method according to EP 0635043 A1 by mixing small amounts of methane with the plasma gas.

DE 102012010542 A1 discloses a further method for producing syngas, in which, similarly to EP 0219163 A2, a hydrocarbon is first thermally split, after which the carbon is converted to syngas with subsequently added steam according to reaction equation (3). However, the essential differences lie in that first, the HC is split in a plasma, and second, the plasma imparts such a high temperature from the outset to the carbon present in the hydrogen stream in the form of fine carbon black particles that no further energy input is necessary. Accordingly, the reactor also no longer contains any fireproof carriers for capturing carbon, and further addition of heat by means of combustion processes is also no longer needed. The essential reaction equations are already known from the aforementioned processes. In the first process step, a hydrocarbon is split, e.g.

$$CH_4 \rightarrow C + 2H_2 + 74.9 \text{ kJ/mol} \qquad (1)$$

In the second process, the carbon produced reacts with water in the heterogeneous WGS reaction:

$$C + H_2O \rightarrow CO + H_2 + 131.3 \text{ kJ/mol} \qquad (3)$$

There are also a number of secondary reactions that mostly take place in parallel, which have an effect on the main reactions, including the homogeneous WGS reaction:

$$CO + H_2O \rightarrow CO_2 + H_2 - 41.2 \text{ kJ/mol} \qquad (7)$$

Because of the exothermic reaction characteristics, higher temperatures shift the reaction equilibrium to the left. At lower temperatures, conversely, the production of $CO_2$ is favored in a detrimental manner. In order to reduce the exothermic reaction according to equation (4) and thus optimize the content of carbon monoxide in the syngas, the second process step is preferably carried out at high temperatures in a range of 1000° C. to 1200° C.

The carbon dioxide thus produced is in equilibrium with the carbon via the Boudouard reaction:

$$C + CO_2 \rightarrow 2CO + 172.5 \text{ kJ/mol} \qquad (4)$$

In the Boudouard equilibrium reaction according to equation (4), the equilibrium shifts at high temperatures to the right. This results in an equilibrium distribution known to the person skilled in the art, for example according to the following table for 1 bara.

| Boudouard equilibrium table | | |
|---|---|---|
| Temperature [° C.] | $CO_2$ [%] | CO [%] |
| 450 | 98 | 2 |
| 600 | 77 | 23 |
| 700 | 42 | 58 |
| 800 | 6 | 94 |
| 900 | 3 | 97 |
| 1000 | 1 | 99 |

In the process, the ratio of hydrogen to carbon monoxide in the final product syngas can be varied over wide rages without producing any noteworthy amounts of carbon dioxide. For this purpose, the amount of added water can be modified or the hydrogen can be at least partially separated after the first step, and the gas from the second process step can thus be added in such a way that a desired ratio of hydrogen to carbon monoxide is established. The thermal energy contained in the syngas is partially used for preheating the supplied water.

DE 102012015314 A1 describes a similar process, with the difference being that the main product is carbon monoxide and carbon dioxide is added to the process rather than water. The relevant reaction equations are the same, but the chemical equilibria are different because of the addition of carbon dioxide instead of water. Here as well, carbon monoxide and hydrogen are produced in separate steps. The thermal energy contained in the carbon monoxide and/or hydrogen produced can also be used via a heat exchanger for preheating the $CO_2$.

SUMMARY

In an embodiment, the present invention provides a method for producing syngas. The method includes a) splitting a hydrocarbon into carbon and hydrogen using a plasma to obtain a first product including carbon and hydrogen, b) mixing steam and carbon dioxide with at least a portion of the first product to produce a product stream, wherein a first portion of the carbon in the first product is converted in an endothermic reaction with steam to carbon monoxide and hydrogen and a second portion of the carbon in the first product is converted in another endothermic reaction with the carbon dioxide to carbon monoxide, and wherein heat is supplied to the endothermic reaction, and c) quenching the product stream of step b).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
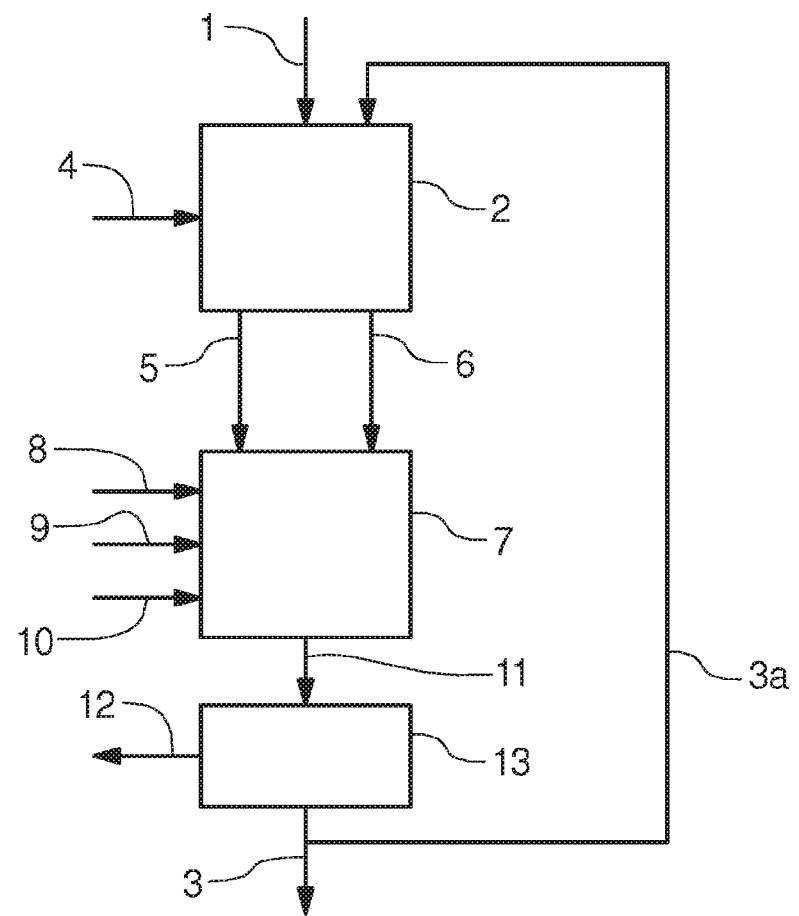
FIG. 1 depicts a flow chart of an illustrative embodiment of a method according to the invention.

A drawback of the methods of the prior art is that the ratios of hydrogen/carbon monoxide ($H_2$/CO) in the syngas cannot be adjusted without adding additional hydrogen, using the excess carbon monoxide elsewhere, or running in discontinuous operation. Data are also lacking on the optimum conditions with respect to a desirable $H_2$/CO ratio and temperature control for producing liquid HC under which the simultaneous production of detrimental byproducts is minimized.

Embodiments of the invention can enable the production of syngas with an adjustable ratio of $H_2$:CO in a more flexible and efficient manner that is largely free of byproducts. In particular, embodiments of the invention can split hydrocarbon compounds and convert the resulting products hydrogen and carbon into syngas by a method having greater efficiency and flexibility than those known in prior art. Embodiments of the invention further provide for control the temperature of the process gas such that optimum reaction control is ensured on the one hand and the coolant has a maximum energy content on the other. Embodiment of the invention further provide for adjusting the reaction conditions such that the ratio of $H_2$ to CO in the process gas can be regulated within a narrow range in order to obtain an optimum composition with respect to a downstream Fischer-Tropsch synthesis.

comprise method and a plant according to embodiments of the invention provide for the combination of a first step in which a hydrocarbon compound is split into hydrogen and carbon with a second step in which a Boudouard reaction and a heterogeneous WGS reaction take place, followed by quenching of the product streams of these steps.

In a method according to an embodiment of the invention for producing syngas, in a process step a), a hydrocarbon is first split using plasma into carbon and hydrogen. The plasma is produced in one or a plurality of plasma generators that are located in a hydrocarbon converter (HC converter). In this case, the plasma arc method—such as the known method developed by the firm Kvaerner (now Aker Solutions) under the name Kvaerner carbon black & hydrogen (kcb&h) process—can be used as a method for splitting the hydrocarbon into carbon and hydrogen. In this process, the hydrocarbon compound is split by supplying a superheated gas (plasma) that has a high energy density. For this purpose, plasma torches known from prior art or adapted embodiments thereof are used.

In a process step b), steam is added to the gas stream and reacted with at least a portion of the product obtained in a) having the main components carbon and hydrogen, preferably at temperatures in the range of 800° C. to 1700° C. In another process step c), carbon dioxide is added to the gas stream and reacted with at least a portion of the product obtained in a) having the main components carbon and hydrogen. Here, a portion of the carbon obtained by splitting reacts with the carbon dioxide to form carbon monoxide, preferably at temperatures in the range of 800° C. to 1700° C.

In this case, conversion of the carbon takes place in a carbon converter. There are no particular limitations on the type of HC used, but natural gas, methane, SNG (synthetic natural gas) and/or heavy fuel oil are preferred. Either one type or a mixture of several of these substances can be supplied to the C converter.

Process steps b) and c) are both endothermic reactions. The required amount of heat to be added is primarily produced in the plasma torch. In this case, the amount of heat is generally not great enough to allow the reactions to be completed. It is therefore necessary to supply additional heat after the endothermic reactions have proceeded to a certain degree in order to ensure maximum conversion of carbon. This additional amount of heat is preferably high enough that the temperature of the reaction mixture does not drop below 800° C.

When the desired conversion rate and the desired ratio of hydrogen to carbon monoxide are achieved, the reaction or process gas from process steps b) and c) is quenched according to the invention. If the reaction gas were not quenched, the energy level would remain so high that many chemical reactions would remain in equilibrium, thus resulting in undesirable reverse reactions, cf. Boudouard equilibrium table above.

After quenching, the process gas can be brought by means of further heat exchangers to an optimum temperature for the further processing steps. Further purification states are optionally provided. All of the cooling devices and optionally the purification stages can be composed of single or multiple parts. Moreover, if the process gas is supplied to a Fischer-Tropsch reactor (FT reactor) for producing functional and non-functional hydrocarbons, the process gas can optionally be further conditioned prior to entry into the FT reactor.

The combination of the above-mentioned Kvaerner method with the heterogeneous reactions of the Boudouard reaction and carbon gasification provides a high-grade syngas that contains, in addition to carbon monoxide and hydrogen, only small amounts of undesirable byproducts and thus simplifies re-utilization.

In many industrial processes and in power plants with combustion processes, large amounts of carbon dioxide, which is considered to be a climate-damaging substance, are produced. The use of this gas for producing hydrocarbons therefore contributes toward protecting the climate. The method according to the invention is more efficient than other methods, including non-sustainable methods such as the CCS (carbon capture and storage) method, in which the carbon dioxide is only removed from the cycle by energy-intensive means, but is not really eliminated. In this respect, operation of these CCS plants can be optimized by means of the method according to the invention in that said plants serve as intermediate storage units for the method according to the invention described here. In the method according to the invention, this approach would even improve the security of supply with respect to the raw material carbon dioxide.

As the method according to the invention is a continuous method, it can be relatively easily integrated into existing continuous processes and can also work highly efficiently in such processes.

The method is also flexible with respect to the type of HC used. For example, it is particularly well-suited for the utilization of HC sources that would otherwise be destroyed unused, such as accompanying gases in petroleum production. Splitting in the plasma torch always gives rise to the same products, carbon and hydrogen, with only the proportions thereof changing.

The effect of the features according to the invention can be advantageously supplemented and enhanced by subsequent features.

As a rule, the streams of carbon dioxide and steam can be added at the same stream section. It is also possible to divide the reactor in the area of the addition sites into at least two separate stream channels. However, carbon dioxide and steam are preferably added successively, so that process step c) can first be carried out and carbon dioxide is added. Only after the carbon dioxide has largely reacted with the carbon to form carbon monoxide is process step b) carried out and steam added. This approach is preferred for two reasons. To begin with, the purpose of carbon gasification by addition of steam to carbon is to increase the hydrogen content. First, the steam would hinder the reaction in process step c), because the steam competes with the carbon of said reaction. The reaction according to process step c) is therefore first allowed to proceed until the desired degree of conversion is achieved, so that sufficient carbon remains for the reaction according to process step b). Second, the reaction according to c) takes place at a higher temperature, which then decreases as the reaction proceeds, and this promotes reaction b), as said reaction takes place at lower temperatures. The method according to the invention, with successive steps of HC splitting, $CO_2$ addition to produce CO, and $H_2O$ addition to produce CO and $H_2$, is therefore fundamentally different from conventional gasification methods, in which a hydrocarbon-containing starting substance is thermally split, in some cases under the action of plasma, and then converted to syngas with simultaneous involvement of steam and carbon dioxide.

In this case, it may be necessary to additionally heat the reaction gas before the addition of steam if the reaction gas should be cooled by the preceding endothermic reaction to such an extent that the optimum reaction conditions for process step b) are no longer present.

In an alternative embodiment, it is also possible to carry out process steps c) and b) multiple times in succession, optionally under heat supply at appropriate sites.

Additional heat is supplied to the reaction gas, as the amount of heat produced in the plasma is not sufficient to carry out the subsequent endothermic reactions. This can be carried out by various methods. First, the respective amounts of carbon dioxide and/or water added can be correspondingly preheated. Other possibilities are heat input inside the reactor by means of heat exchangers, electric heaters, or heaters operated by means of burners. Depending on the embodiment, the heat is transferred by convention or by radiation. In use of built-in heaters, such heaters are preferably designed so that deposition of carbon black particles contained in the gas flow is prevented. In any event, a regulating device is used to ensure that the temperature required for the respective reactions is maintained, thus ensuring that conversion of the carbon will be as high as possible.

Another possibility for heat input is the co-combustion of portions of the hydrocarbon fed into the reactor. This partial oxidation requires the supply of pure oxygen. The supply of air containing oxygen is unsuitable, as nitrogen contained in the air can react at the high reaction temperatures to form undesirable and also toxic compounds that must be removed by complex methods in the downstream purification stages. The amount of the pure oxygen must be precisely dosed in order to prevent excessive elevation of the temperature. The reaction products of methane combustion are $CO_2$ and $H_2O$. These substances are already planned educts of the process and therefore have no detrimental effect. These two substances must only be taken into account in the addition thereof according to the invention.

In step e), the product stream of steps b) and c) is preferably quenched to a temperature of 400° C. or less than 400° C.

In the above Boudouard equilibrium table, the chemical equilibria of the Boudouard reaction are shown as a function of temperature. These equilibria are established when the temperature is slowly modified. In this example, therefore, the target product carbon monoxide is almost completely reacted back to carbon dioxide at low temperatures in the range of about 400° C. This reverse reaction can be prevented by suddenly raising the temperature to a level at which chemical reactions no longer take place. In this manner, the mixture composition, which is at a high temperature level, remains below a limit temperature. This rapid cooling is also referred to as quenching. The rate of temperature change in this case depends on the respective process.

It is only at a temperature of less than 400° C. that one can be certain that the reactions will be stopped. The temperature level of 400° C. is also advantageous in that it allows an extremely energy-efficient high vapor pressure to be produced for further use in the plant's steam network. In the first cooling step, the temperature of the product gas is preferably quenched to a temperature in the range of 300° C. to 400° C. or to slightly below 400° C., and particularly preferably to a temperature in the range of 350° C. to 400° C. or to slightly below 400° C. In the case of quenching below these temperatures, the energy content of the superheated steam becomes steadily lower, and the heat exchanger used for quenching would have to be increasingly large.

Several methods can be used for quenching. The first possibility is direct cooling with liquid water, wherein the heat is withdrawn from the reaction gas by the vaporization heat of the evaporating water. This type of quench can be achieved by means of a simple design. In this case, the added water must then be removed by means of a condenser, because it would be detrimental in a downstream FT process, for example. A further possibility lies in reducing the temperature by heat dissipation in an endothermic reaction. For this purpose, corresponding reactants are mixed into the gas mixture. A third possibility is a heat exchanger with a particularly high transferrable heat flow, wherein the temperature of the gas mixture after quenching does not fall below the dew point temperature in this case. The relevant design considerations to be taken into account are known to the person skilled in the art and will not be presented in further detail here.

In a method according to an embodiment of the invention, the split HC steam and carbon dioxide are added, both of which react with the carbon produced. In this case, the carbon dioxide primarily yields carbon monoxide, and the steam primarily yields carbon monoxide and hydrogen. These decisive influencing factors thus form the basis for the method according to the invention, in which the ratio of the products hydrogen and carbon monoxide is regulated by the supply ratio of steam to carbon dioxide. Using the described essential reaction equations alone, however, the resulting reaction equilibria can only be approximately determined, as a series of secondary reactions also take place that are also dependent on pressure and temperature. A regulating system is therefore preferably used for finely dosing the individual mass flows of steam and carbon dioxide in which the gas composition at the outlet of the reactor is measured and the individual mass flows are regulated based thereon. Here, the regulating system also takes into account the ratio of the sum of steam and carbon dioxide to the amount of supplied HC.

Because of this selective regulation of the feed materials carbon dioxide and water and an optimized temperature control of the process, the method is largely independent of the type of HC used, and it is possible to achieve an optimum composition of the product gas, in particular with a specified ratio of hydrogen to carbon dioxide, with respect to subsequent synthesis reactions. The educts are almost completely converted. The formation of undesirable byproducts is minimized, which simplifies the corresponding processing steps and makes the method more economical.

An optimum ratio of hydrogen to carbon monoxide of 2:1 in syngas for producing liquid hydrocarbons is often given in the literature. In these synthesis reactions, one always obtains a mixture of various long-chain hydrocarbons, which can also have functional groups. In the production of hydrocarbons that are preferably to be used as fuels, the occurrence of short-chain compounds is undesirable, as these are unusable for the intended purpose or are identical to the raw materials of the method. They must be separated from the product in separate processes, and corresponding uses for them must be found. In this case, the simplest possibility of use is recycling in syngas production. Surprisingly, it was found that the generation of undesired short-chain hydrocarbons such as methane or ethane is largely inhibited when the ratio of hydrogen to carbon monoxide in the syngas is adjusted to a range of 1.5:1 to 2.1:1, preferably 1.75:1 to 1.95:1, and particularly preferably 1.85:1 to 1.90:1. The reason for this reaction behavior lies in the small molecular size of hydrogen, resulting in a high diffusion rate and causing the hydrogen to preferentially participate in reactions on the catalyst surface in the FT process. From a microscopic standpoint, this means that less hydrogen is required than would be required macroscopically based on the stoichiometry.

A portion of the syngas produced is preferably used as a plasma gas. Because of its high energy density, a relatively small amount of the gas is needed. For example, the content ratio of the recycled syngas to methane as a hydrocarbon is in a range of 5% to 30%, and preferably 8% to 15%.

In order to start up a device—also referred to in the following as a reactor—for carrying out the method, hydrogen, which is provided in compressed gas tanks, is used on a transitional basis. The use of inert gas is also possible, but tends to be less preferable because of the high cost thereof. Before entering the reactor, the plasma gas must be purified of any components that might be harmful to the electrode, such as carbon dioxide.

In order to provide optimum reaction conditions for the endothermic processes in the reactor, the educts HC, carbon dioxide, and steam are preheated before entering the reactor, or the water is vaporized to steam. As a rule, all streams of the method from which heat must be discharged may be preheated, for example the HC stream from a subsequent FT process, the quenching zone of the syngas reactor, or the coolant for the plasma electrode.

The syngas produced can be used not only for synthesis purposes, but may also be used in a known manner for producing electrical energy. For example, this electrical energy can be used for operating the plasma torches. For this purpose, a portion of the thermal energy of the syngas can be used to produce steam for operating steam turbines, or the syngas can be directly burned to operate gas turbines.

Splitting of HCs in the method for producing syngas is preferably carried out at temperatures in a range of 900° C. to 1500° C.

The method is also used at elevated pressures, a method that has not been known to date in reactors for HC splitting by means of plasma.

In a preferred embodiment of the method, step a) of claim 1 is carried out in one or a plurality of HC converters at a working pressure in the range of 1 bara to 200 bara, preferably in the range of 1 bara to 50 bara, and particularly preferably at pressures in the range of 10 bara to 25 bara. Looking at the relevant reaction equations (1) through (4), one notes that the mole contents of the gaseous reactants roughly double. A high pressure also generally counteracts the course of the respective forward reaction. The hydrocarbon splitting in Kvaerner reactors is ordinarily carried out at pressures of only a few bar. In the method according to the invention, the two processes are preferably carried out in a common pressure chamber so that the HC splitting is also carried out at elevated pressures. This approach is advantageous in that either the syngas produced no longer needs to be condensed, or only low capacity condensers are needed to introduce the syngas into a downstream FT reactor, where a high pressure has an advantageous effect on the reaction equilibria.

Because of the particular process control involved, the syngas produced in the method according to the invention is optimized for use in a downstream FT process. An advantageous use of the method lies in the production of synthetic functionalized and/or non-functionalized hydrocarbons. Here, functionalized hydrocarbons are understood to be hydrocarbons to which at least one functional group has been added.

In the production of functionalized and/or non-functionalized hydrocarbons in a downstream FT process, in addition to the target product(s), byproducts are often produced whose processing is not worthwhile because of the small amount thereof or for which there is no economical use. These substances can advantageously be recycled as adducts to the inlet of the HC converter or can be used as fuel for heating devices to preheat the educts.

There are no particular limitations on the type of downstream FT processes. For example, the syngas produced in the method according to the invention can be used in SMDS methods, Bergius-Pier methods, Mtl methods, or in combinations of these methods.

A method according to an embodiment of the invention is particularly suitable for producing paraffin, diesel fuels, gasoline fuels, kerosene, methanol, methane, or liquefied gases.

A method according to an embodiment of the invention for producing syngas is preferably carried out in a plant comprising the following: a plasma-operated hydrocarbon converter with at least one inlet for a HC-containing fluid and at least one common outlet for carbon and hydrogen; and a carbon converter with at least one inlet for carbon and hydrogen, at least one inlet for carbon dioxide, at least one inlet for water or steam, and at least one outlet for syngas, wherein the at least one inlet for carbon and hydrogen of the carbon converter is connected to an outlet for carbon and hydrogen of the hydrocarbon converter by means of a connecting line.

Moreover, the plant advantageously comprises a regulating device, which analyzes the composition of the gas mixture flowing from the C converter, and based thereon the volume flows of the streams of carbon dioxide and water fed into the C converter, and in the process, regulates the volume ratio of carbon dioxide to water such that the composition of the gas flowing from the C converter has a ratio of the components hydrogen to carbon monoxide that is in a range of 1.75:1 to 1.95:1. In this manner, it is ensured that the gas flowing from the C converter has the desired composition.

The plant for producing syngas preferably comprises an HC converter with a plasma torch that is configured as a Kvaerner reactor.

In a preferred embodiment, at least two of the plant components HC converter, C converter, and quench are combined into an integral device housing. This provides at least one inlet for hydrocarbon, plasma gas, carbon dioxide, and steam and at least one outlet for the syngas. Alternatively, the inlet for hydrocarbons and plasma gas can be combined.

A syngas converter (CO converter) for producing synthetic functionalized and/or non-functionalized hydrocarbons is preferably connected to the plant according to the invention for producing syngas. This converter can comprise an FT reactor that is configured as an SMDS converter, a Bergius-Pier converter, an Mtl converter, or a combination of at least two of these converters.

In order to ensure that the syngas is pure, further purification steps may be required that depend on the properties of the raw materials. The purification steps may be carried out either prior to entry of the raw materials into the reactor or after exiting of the product gas from the reactor.

As a rule, the reaction mixture can be fed through the reactor from top to bottom or from bottom to top. However, the stream should preferably flow from top to bottom, because in this case, discharging of any deposits is aided by gravity. In a preferred embodiment, a reactor for carrying out the method according to the invention comprises a cylindrical casing whose ends are sealed off by curved bottoms. The internal diameter of the reactor and its length are determined based on the pressure, temperature, and residence time. Depending on the axial position or the position with respect to the addition sites of carbon dioxide and steam, the axial flow rate in the reactor is in a range of 0.05 m/s to 1.3 m/s.

In order to prevent deposits, built-in components are preferably avoided or reduced to a minimum. Other measures for preventing deposits include supplying the plasma gas to the upper part of the reactor. In this case, a plasma torch is preferably configured such that a circular plasma jet is produced and the HC stream is guided through the center thereof. This results in obligatory contact of the HC with the plasma gas and provides optimum conditions for virtually complete splitting. A peak temperature in the range of 2000° C. to 20,000° C. is generated in the produced plasma stream, which after mixing with the HC stream decreases to a mixing temperature in the range of 800° C. to 1700° C., depending on the mixing ratio.

The educts carbon dioxide and steam to be added in the further course of the reaction are evenly distributed over the circumference by ring lines arranged outside the reactor. By means of connecting lines, the educts are distributed over a plurality of nozzles evenly distributed over the circumference, and via these, finely distributed into the internal space of the reactor and thus mixed with the main steam. The mixing can be further improved by means of static mixers. The circular distribution lines can also be directly welded to the reactor housing or can be configured as semicircular lines. In a preferred embodiment, distribution nozzles leading into the inside of the reactor can be inclinable and tangentially displaceable relative to the main flow in order to produce a vortex flow.

The endothermic reactions cause the temperature to decrease along the flow progression of the reactor. The temperature of the plasma is not high enough for the amount of heat added to be sufficient for carrying out all of the intended reactions. It is therefore necessary to supply additional heat to the reactor at suitable axial sites in said reactor. Graphite electric heaters are preferably used for this purpose. This material is resistant to temperature and corrosion. Moreover, the output of such a heater can be regulated, allowing optimum regulation of the process.

All gases, both educts and products, contain hydrogen. Accordingly, all parts coming into contact therewith are composed of hydrogen-resistant materials. The parts in question can be configured either to consist entirely of the hydrogen-resistant material or can be plated together with said material. Because of the high temperatures, the reactor is lined on its inner side with fireproof material. The thickness of the lining depends on the locally prevailing temperature. Lining thicknesses in the range of 300 to 800 mm are preferred. This makes it possible to limit the temperature of the reactor housing to relatively low temperatures in the range of 150° C. to 400° C., and preferably 180° C. to 250° C. During operation, because temperatures in the inside of the reactor are in the range of 800° C. to 1700° C., different thermal expansions occur in different areas of the reactor. This is taken into account by means of corresponding design measures, for example by configuring the fireproof lining with moveable layers. There are no particular limitations on the type of fireproof material used, but graphite is preferred because this material is heat-resistant up to about 2500° C. and corrosion-resistant.

Particularly on starting up the reactor, internal tensions may develop in the device components that may result in failure. For this reason, before the reactor is put into operation, it is first heated in a controlled manner at a sufficiently low heating rate. In this case, the heating rate is essentially determined by the dimensions and the material properties of the reactor. In a preferred embodiment, the reactor is equipped on its outer side with a plurality of heating channels through which a heat transfer medium is fed for heating purposes. These same heating channels can also be used for controlled shutdown of the reactor when repair or maintenance work is carried out on it. In this case, the correspondingly temperature-controlled heat transfer medium serves as a coolant. Depending on the type of operation, steam or water is preferably used as a heat transfer medium. The reactor is thermally insulated according to criteria known to the person skilled in the art in order to avoid heat losses.

In detail, FIG. 1 shows an illustrative embodiment of a method according to an embodiment of the invention for producing syngas in multiple successive steps. In this case, a hydrocarbon (HC) 1 is first supplied to a hydrocarbon converter (HC converter) 2.

At the same time, a portion 3a of the syngas 3 produced in the process is recycled to the HC converter 2. Using electrical energy 4, a plasma (not shown here) is produced from the recycled syngas 3a which is used to split the fed-in HC 1 into carbon 5 and hydrogen 6. The two decomposition products carbon 5 and hydrogen 6 are supplied in separate lines to a carbon converter (C converter) 7.

Steam 8 and carbon dioxide 9 are supplied to the C converter 7, wherein the order thereof is interchangeable; they can also be supplied simultaneously.

In the illustrative embodiment shown in FIG. 1, steam 8 is first supplied to the C converter 7. This is mixed with at least a portion of the product 5, 6 obtained by HC splitting in the HC converter 2 containing the main components carbon 5 and hydrogen 6. In this process, a portion of the carbon obtained by splitting 5 is converted with the steam 8 to carbon monoxide and hydrogen, preferably at temperatures in the range of 800° C. to 1700° C. Heat 10 is supplied to this partial process so that the temperature of the reaction gas mixture does not drop below 800° C. Moreover, carbon dioxide 9 is also supplied to the C converter 7. This carbon dioxide is mixed with at least a portion of the product 5, 6 obtained by HC splitting in the HC converter 2 containing the main components carbon 5 and hydrogen 6. In this process, a portion of the carbon obtained by splitting 5 is converted with the carbon dioxide 9 to carbon monoxide, preferably at temperatures in the range of 800° C. to 1700° C. Heat 10 is also supplied to this partial process so that the temperature of the reaction gas mixture does not drop below 800° C.

Heat 12 is then discharged from the product stream 11 of the C converter 7 into a quench 13 until a temperature below 400° C. is reached. In this case, the cooling rate selected is high enough to reliably prevent chemical reactions. In this manner, the product composition of the process gases flowing from the C converter 7, i.e. syngas 3, is maintained. A partial stream 3a is withdrawn from the syngas 3 flowing from the quench 13 and recycled as plasma gas into the inlet of the HC converter 2.

Figure 2:
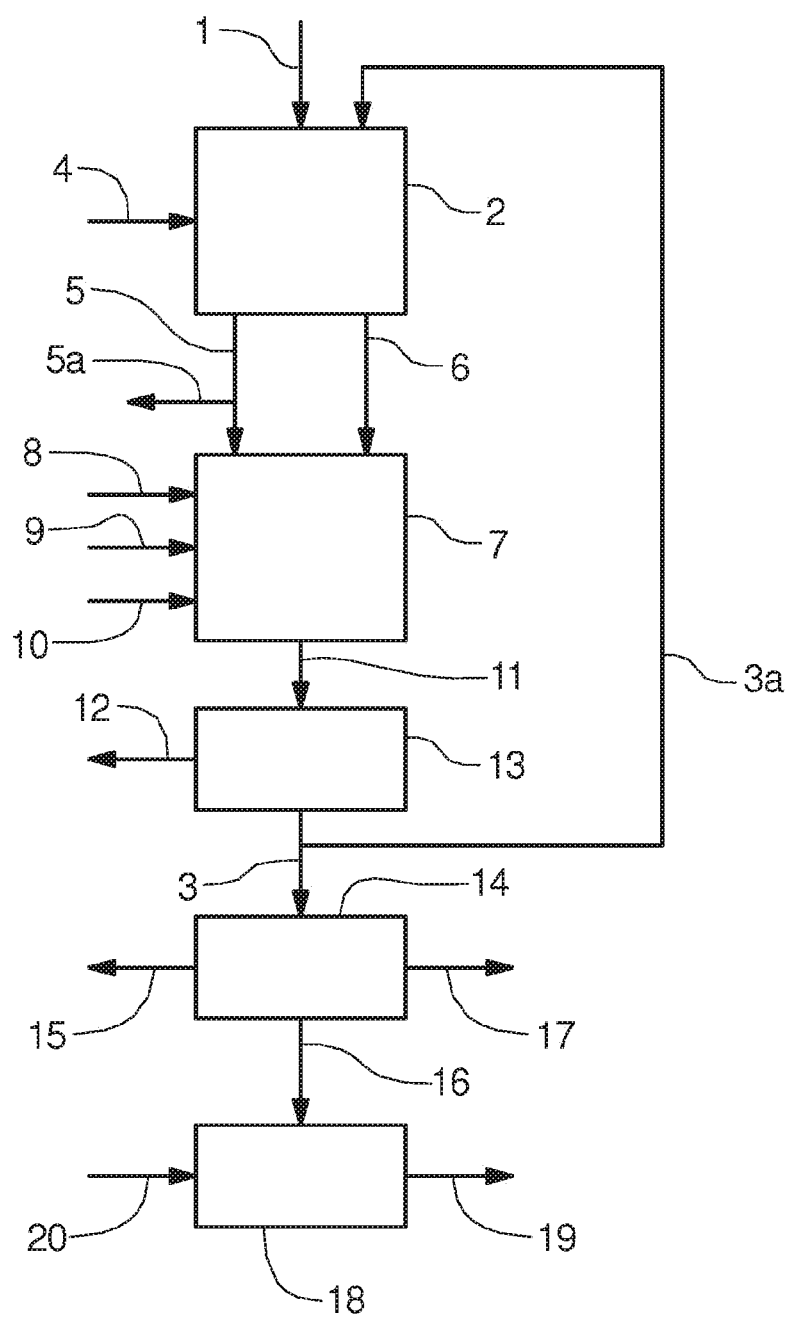
FIG. 2 depicts a flow chart of the illustrative embodiment of the method of FIG. 1, with further process steps for producing a hydrocarbon middle distillate with syngas as an intermediate product.

FIG. 2 shows an expansion of the method shown in FIG. 1. The first part of the method for adding the HC 1 to a HC converter 2 until the produced syngas 3 exits a quench 13 is identical to the method described in FIG. 1, with the exception of the withdrawal of carbon 5 between the HC converter 2 and the C converter 7. The withdrawn carbon 5a is supplied to a separate industrial application. The withdrawal of carbon 5 increases the relative amount of hydrogen 6 supplied to the C converter 7 by the HC converter 2.

The syngas 3 flowing from the quench 13 is supplied to a CO converter 14. This is preferably configured as a Fischer-Tropsch converter. In this converter, synthetic functionalized and/or non-functionalized hydrocarbons are produced from at least a portion of the syngas 3 of the preceding process step. The heat 15 generated in the exothermic reactions taking place in this case is discharged from the CO converter 14. It can be used in other sections of the plant, for example in the process section for producing syngas 3 to preheat the educt steams 8, carbon dioxide 9, or the recycled syngas 3a used as plasma gas. The process gas 16 of the CO converter 14 essentially contains a plurality of different HCs and water 17. In this example, this water 17 is captured in the CO converter 14 itself and discharged. The mixture obtained in this manner is separated in a refinery 18 under the supply of heat 20 into different HC fractions having different average boiling points. Of particular interest here is the discharged middle distillate 19, the composition and proportion of which depends on the composition of the supplied syngas 3 and the process control in the CO converter 14. The HCs separated from the middle distillate 19 can be recycled—not shown here—as educts via the HC converter 2 to the syngas production. This saves on raw materials and solves the problem of waste disposal.

Figure 3:
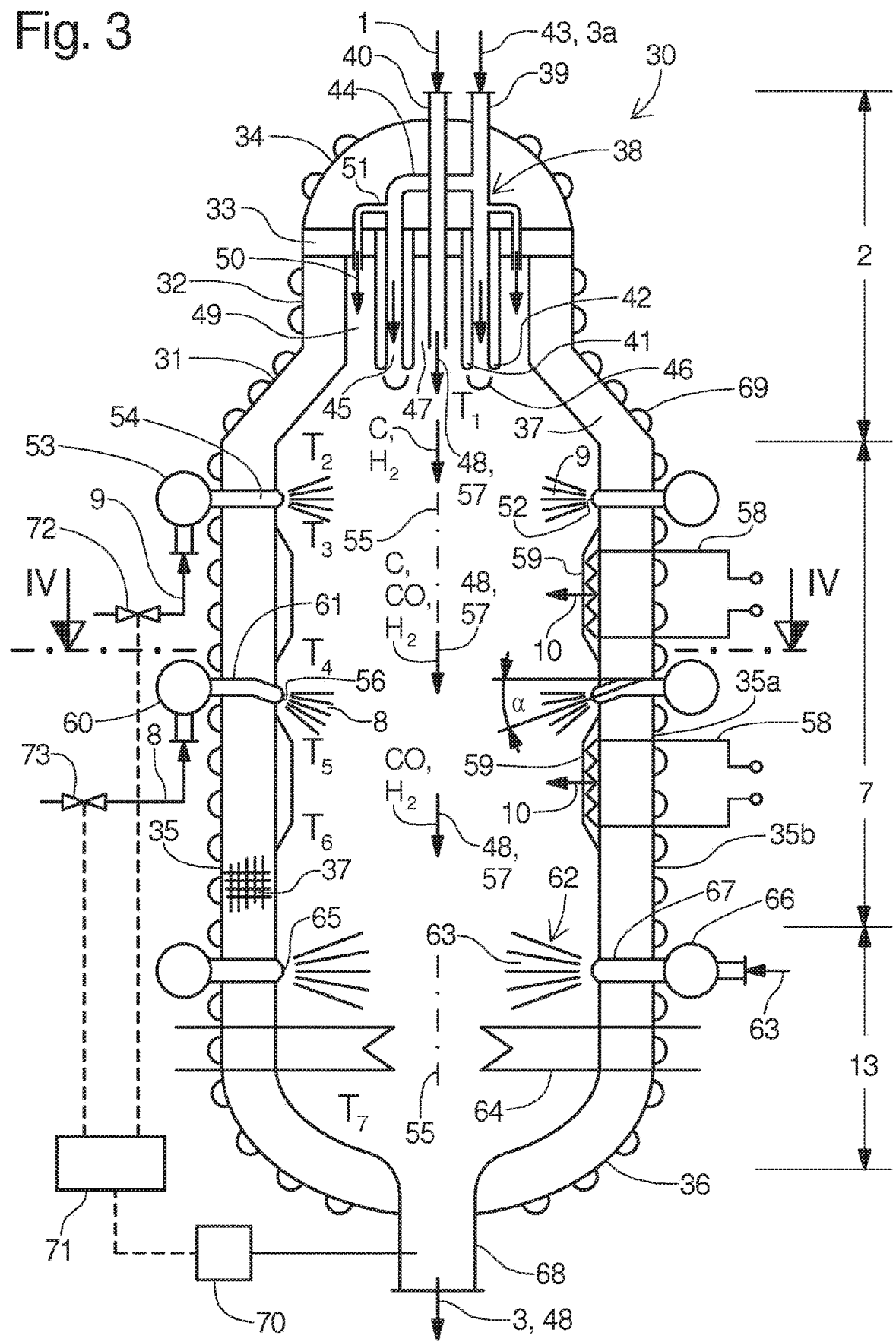
FIG. 3 depicts a longitudinal section through an embodiment of a plant according to the invention, wherein the individual plant components are arranged in an integral device housing.

As an example, FIG. 3 shows an embodiment in which the HC converter 2, the C converter 7, and the quench 13 are arranged in a common apparatus or reactor 30 in this order from top to bottom.

The HC converter 2 has a conical casing 31, an (upper) cylindrical casing 32, an electrode holder 33, and an upper hood 34 that spans the electrode holder 33. The conical casing 31 is tapered upward. At its lower, wide end, it is connected to the upper end of a lower cylindrical casing 35 that extends downward and forms first a casing 35a of the C converter 7 and then a casing 35b of the quench 13. The lower closure of the common reactor 30 forms a lower hood 36 that is connected to the lower end of the lower cylindrical casing 35.

The conical casing 31 and the cylindrical casings 32, 35, as well as the lower hood 36 of the common reactor 30, are equipped with an inner fireproof lining 37 for protection against the high temperatures. The fireproof lining 37 is ordinarily composed of materials such as stone- or ceramic-based materials. However, graphite is at least partially used as a particularly preferred material.

The conical casing 31 of the HC converter 2 is connected at its upper, tapered end to the lower end of the cylindrical casing 32 of the HC converter 2. The electrode holder 33 is attached at the upper end of this casing 32.

A plasma generator 38, which is fed by a plurality of feed lines 39, 40, is attached to the electrode holder 33. The plasma generator 38 comprises inner and outer ring electrodes 41, 42 that are attached to the electrode holder 33 such that they are arranged concentrically and electrically insulated from one another and extend vertically approximately up to the lower end of the cylindrical casing 32 of the HC converter 2. The electrode holder 33 is preferably configured as a flat plate. This facilitates mounting of the parts connected thereto. The plasma gas 43 is evenly distributed via a plasma gas feed line 39 through the upper hood 34 and through a distributor 44 in the annular space 45 between the inner ring electrode 41 and outer ring electrode 42. At the lower end of the ring electrodes 41, 42, an electric discharge occurs, causing the formation of a plasma arc 46 in which a plasma is produced from the supplied plasma gas 43. Conventional plasma gases are inert gases or hydrogen. However, these gases are quite expensive and as a rule are therefore used only to start up the reactor 30. For stationary operation, a small portion 3a of the syngas 3 produced in the reactor 30 is preferably recycled to the inlet of the HC converter 2 as plasma gas 43.

The HC 1 to be split is supplied via a central line 40 into the inner space 47 of the inner ring electrodes 41 of the plasma generator 38. This central line 40 is configured in a known manner, and can for example also be axially shifted in a manner not shown here in order to obtain optimum conditions for the splitting reaction.

Both the central line 40 and the ring electrodes 41, 42 can be cooled by means of integrated cooling channels. However, the walls of both the central line 40 and the ring electrodes 41, 42 preferably have a solid configuration.

After mixing the HC stream 1 with the plasma gas 43, the reaction gas 48 has a temperature $T_1$ in the range of 900° C. to 1700° C.

There is a safety margin between the outer ring electrodes 42 and the fireproof lining 37, which gives rise to an outer annular space 49. In order to minimize backflows of the plasma gas 43, possibly leading to carbon deposits in this outer annular space 49, this space can be flushed with a protective gas 50. An inert gas or hydrogen can be used as a protective gas 50. As shown in FIG. 3, however, a small portion of the plasma gas 43 fed into HC converter 2 is preferably withdrawn and fed into the outer annular space 49 via one or a plurality of protective gas lines 51.

The HC converter 2 merges with the conical casing 31 or transition section into the C converter 7. The expansion of the cross-section slows the flow rate and correspondingly increases the residence time.

Figure 4:
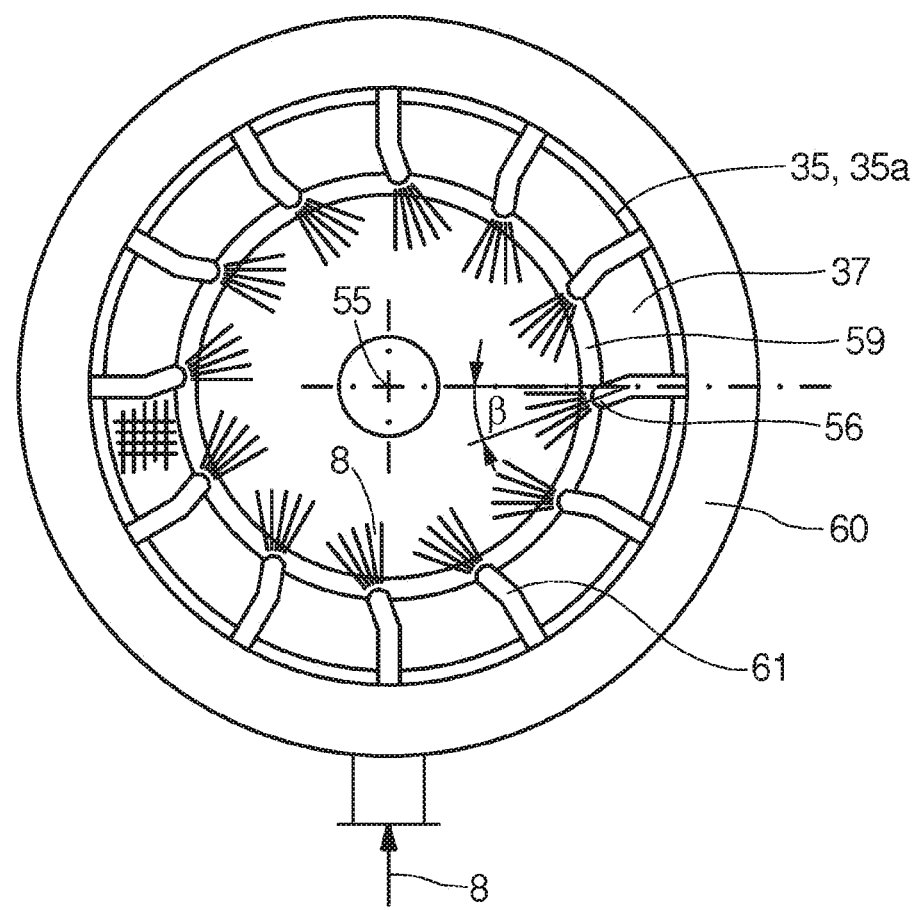
FIG. 4 depicts a section through the plant of FIG. 3 along line IV-IV.

In the heat-absorbing splitting reaction, in which the HC 1 is largely split into carbon 5 and hydrogen 6, the temperature drops to a value of $T_2$. Near the inlet of the carbon converter (C converter) 7, preheated carbon dioxide 9 is now supplied via a plurality of distribution nozzles 52 distributed over the circumference of the C converter 7. For this purpose, the carbon dioxide gas 9 is first fed into a ring distributor 53, which encircles the C converter 7 in the shape of a torus. From this distributor, a plurality of distribution lines 54 branch off through the lower cylindrical casing 35 to the distribution nozzles 52 directed toward the interior of the C converter. The distribution nozzles 52 can point directly to the C converter or reactor axis 55. In a preferred embodiment, however, these are arranged (similarly to the distribution nozzles 56 for water or steam mentioned below) inclined with respect to the reactor axis 55 at an angle α, wherein the angle of inclination is in the range of 0° to 35°, and preferably in the range of 0° to 20°. In a further preferred embodiment, the distribution nozzles 52, as shown in FIG. 4, are arranged acentrically to the device axis 55 at an angle β in the range of 0° to 30°, and preferably at an angle in the range of 0° to 15°. The distribution nozzles 52, 56, 65 extend only minimally into the inside of the reactor in order to minimize deposits, flow effects, and/or abrasion. The length of their extension into the inside of the reactor is 0 to 50 mm. The distribution nozzles are preferably flush with the inner wall.

The gas 9 flowing from the distribution nozzles 52 flows at a sharply higher rate than the main gas stream 57 flowing along the reactor axis 55. The rate of the main gas stream 57 is in a range of 0.05 to 1.3 m/s, and preferably 0.1 m/s to 0.7 m/s. The rate of the dispersion nozzle streams is in a range of 0.8 m/s to 10 m/s. Because of the sharply higher rate of the dispersion nozzle streams compared to the rate of the main gas stream 57, additional mixing devices can be dispensed with. The number of distribution nozzles 52 distributed over the circumference depends on the inside diameter of C converter 7. Here, the distance of the distribution nozzles 52 from one another in the direction of the circumference is in the range of 30 to 200 mm. It also depends on the angle passed by the exiting gas 9. The distribution nozzles 52 can also be arranged—not shown here—in two axially spaced levels, wherein the distribution nozzles 52 in the main flow direction are staggered with respect to one another. The axial distance between the layers equipped with distribution nozzles 52 is preferably in a range of 20 to 200 mm. Depending on the temperature and amount of carbon dioxide 8 added, the reaction gas 48 now has a temperature of $T_3$.

In order to provide optimum conditions for the subsequent endothermic Boudouard reaction, heat 10 is supplied to the reaction gas 48 by an electric heater 58. The heating element 59 is preferably composed of graphite. The heat 10 is supplied primarily by thermal radiation, and secondarily by convection. After this reaction step, the reaction gas is at temperature $T_4$. At this point, the reaction gas 48 essentially contains carbon monoxide, hydrogen, unconverted carbon, and small amounts of unreacted carbon dioxide, and in some cases small residual amounts of methane.

At a second addition station, steam 8 as saturated steam or preferably as superheated steam is added to the reaction gas 48 via distribution nozzles 56 and supplied to the main gas stream 57. The addition device is configured with a ring line 60, distribution lines 61, and distribution nozzles 56 similarly to the device described above for the addition of carbon dioxide 9. After mixing of the main gas stream 57 with the steam 8, the reaction mixture has the temperature $T_5$.

In order to provide optimum reaction conditions for the subsequent endothermic heterogeneous WGS reaction, heat is supplied to the reaction mixture by a further electric heater 58 that is configured similarly to the aforementioned heater after the addition of carbon dioxide 9. After this reaction step, the reaction gas has a temperature of $T_6$. At this point, the reaction gas essentially contains carbon monoxide and hydrogen.

After completion of the reactions, the reaction mixture 48 is quenched. This is carried out either by means of direct cooling 62 by injection of liquid water 63, or alternatively or in combination with a quench heat exchanger 64. In order to carry out the direct cooling, the quench 13 is equipped with an injection device 65, 66, 67 that is configured similarly to the addition device 56, 60, 61 for water 8 of the C converter 7. From a ring line 66 guided around the quench 13, a plurality of distribution lines 67 branch off through the lower cylindrical casing 35 to distribution nozzles 65 that are directed toward the interior of the quench 13.

In the illustrative embodiment shown, the quench heat exchanger 64 is arranged downstream of the direct cooling 62.

After quenching, the reaction mixture 48 has a temperature $T_7$ of less than or equal to 400° C., at which reactions no longer take place. The syngas 3, 48 now essentially contains carbon monoxide and hydrogen. In its apex area, the lower hood 36 comprises an outlet connection 68, from which the syngas 3, 48 and optionally water are released.

The syngas 3, 48 is fed to a CO converter 14 known per se, in particular to a Fischer-Tropsch converter for producing the functionalized and/or non-functionalized hydrocarbons, which is not shown in further detail.

The reactor 30 is further equipped with heating or cooling channels 69 for controlled heating or cooling of the reactor 30. The heat transfer medium used in this case is preferably liquid or gaseous water, but other suitable heat transfer media, such as thermal oils, can also be used.

At the outlet of the reactor 30, there is an analysis unit 70 by means of which the gas composition of the product gas 48, i.e. the syngas 3, is analyzed. The analysis results are sent on to a regulator 71 that regulates the ratio of the added amounts of carbon dioxide 9 and steam 8 in the C converter 7 by means of a regulating valve 72 for carbon dioxide 9 and a regulating valve 73 for steam 8. In this case, the ratio of the sum of carbon dioxide 9 and steam 8 to the supplied HC 1 is also taken into consideration.

All individual components of the reactor 30 are designed for an internal pressure in a range of 2 to 50 bara and preferably a range of 10 to 25 bara. As hydrogenous gases are fed through the reactor 30, at least all of the components coming into contact with these gases are made of hydrogen-resistant materials. Hydrogen-resistant stainless steel is preferably used. This can be plated onto a base material, or the reactor walls 31, 32, 34, 35, 36 and the electrode holder 33 are composed completely of this material. For reasons of clarity, further equipment characteristics of the reactor 30 that are part of the usual further construction, such as the support structure, thermal insulation, potential equalization, connecting pieces for maintenance and measurement instruments, connectors for the heat transfer medium, inspection platforms, or the electrical installation are not shown.

FIG. 4 shows a section through the reactor 30 shown in FIG. 3. Shown here is the acentric arrangement of the injection nozzles or distribution nozzles 56 for steam 8. The injection nozzles 56 are arranged offset by an angle β with respect to a straight line that runs radially, i.e. through the reactor axis 55. The ring distributor 60 surrounding the reactor and the distribution lines 61 branching therefrom are also shown.

Figure 5:
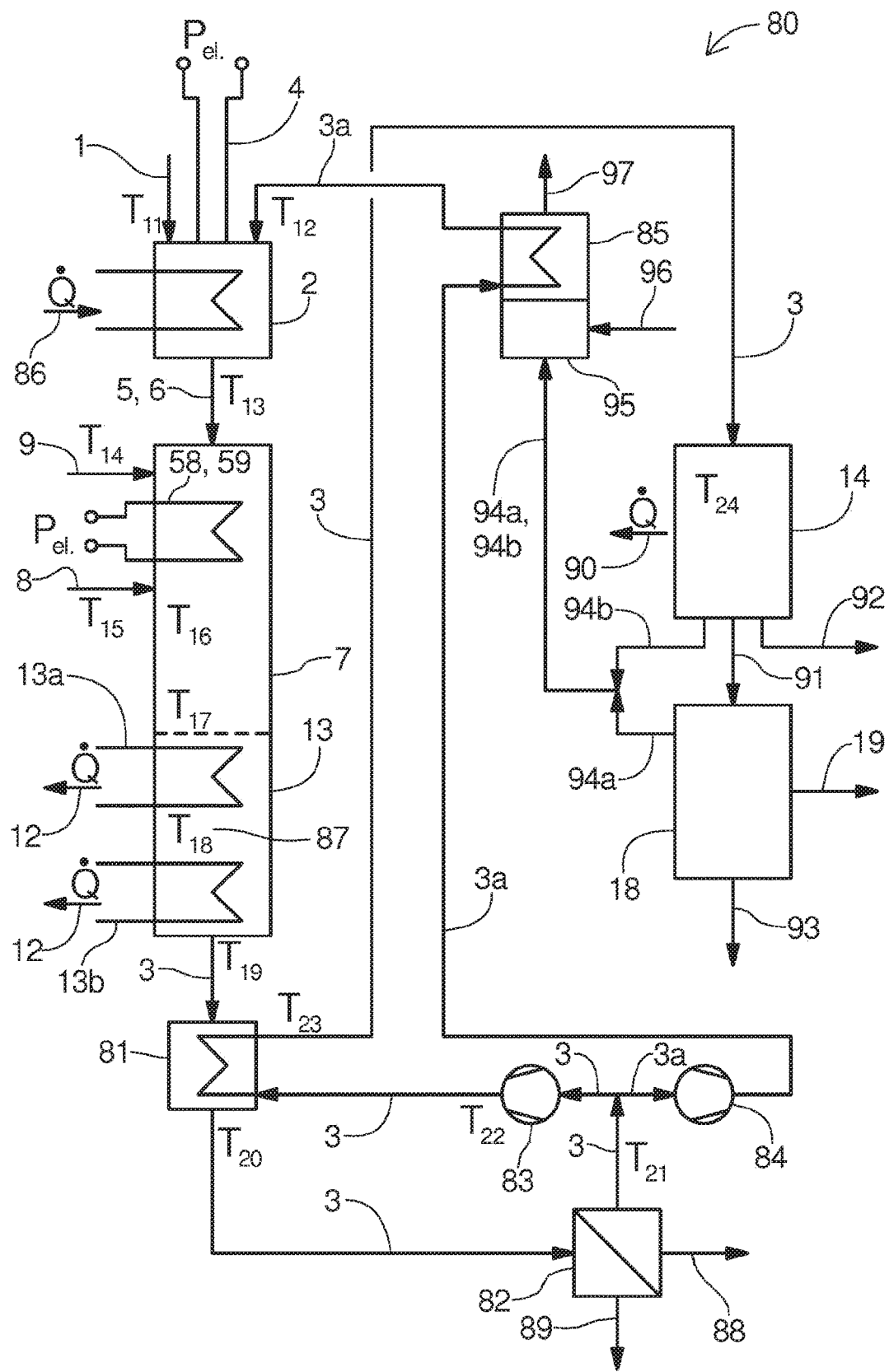
FIG. 5 depicts a flow chart of an embodiment of a plant according to the invention for producing hydrocarbons.

A flow chart of an entire plant 80 for producing liquid hydrocarbons using the method of the invention is shown in FIG. 5. This entire plant 80 comprises an HC converter 2 and a C converter 7 with an inlet for the process gas 5, 6 from the HC converter 2, an inlet for carbon dioxide 9, an inlet for steam 8, and an outlet for the produced syngas 3. In the downstream area of the C converter 7 is a multipart quench 13 that individually circulates heat transfer medium to supply heat to various plant components. On exiting the quench 13 of the C converter 7, the syngas 3, after passing through a cooler 81, is first fed to a purification stage 82. The main portion of the purified syngas 3 is then fed via a high-pressure condenser 83 through the aforementioned cooler 81, where it cools the syngas 3 flowing from the C converter 7 and is thus heated. The syngas 3 is then fed to a CO converter 14, which is configured here as a FT reactor. A small partial stream 3a of the syngas 3 coming from the purification stage 82 is recycled by another condenser 84 via a heater 85 back to the HC converter 2 for use as plasma gas.

The parameters of the individual plant components or process stages are explained in the following in greater detail by means of an example. A molar flow of methane as a HC 1 of 1.0 kmol/s, equivalent to 16 kg/s, is supplied to the HC converter 2 operated at a pressure of 20 bara. The plasma torch or plasma generator receives a mass flow of 1.07 kg/s of recycled syngas 3a. The two mass flows are separately preheated before entering the HC converter 2 to an inlet temperature $T_{11}$ and $T_{12}$ of 450° C. A reaction energy 4 of 72.5 MW is required to split the methane according to reaction equation (1) at a conversion rate of approximately 97%. Taking thermal losses into account, a further 119.5 MW is required in order to heat 86 the reaction gas mixture to a temperature $T_{13}$ of 1600° C. up to the outlet of the HC converter 2, so the total energy requirement for the HC converter is 192 MW. This is equivalent to a specific energy requirement of 4.6 kWh/kgC relative to the total C content of the reaction gas mixture.

In the second part of the reactor, the C converter 7, the carbon 5 is converted. For this purpose, a stream of 17.7 kg/s of carbon dioxide ($CO_2$) 9 and 12.7 kg/s of steam ($H_2O$) 8 is fed into the process. The carbon dioxide 9, which in this case originates from a power plant, has a temperature $T_{14}$ of 414° C. after compression to the process pressure of 20 bara. The steam 8 is first overheated to a temperature $T_{15}$ of 400° C. and then injected further downstream into the C converter 7. The mixing of the product gas 5, 6 from the HC converter 2 with the two educt streams of carbon dioxide 9 and steam 8 yields a mixing temperature $T_{16}$ of 1122° C.

Both the Boudouard and the heterogeneous WGS reaction are endothermic. Assuming complete conversion of the carbon, this gives a required reaction heat of 140.6 MW. This is partially provided by thermal output of the reaction gas mixture. In order to ensure maximum carbon conversion, a decrease to a minimum temperature $T_{17}$ of 1000° C. is allowed. The temperature difference of 122° C. is equivalent to a sensible heat of 15.8 MW. "Sensible heat" is understood to refer to the amount of thermal change that does not result in phase change. The residual reaction heat of 124.8 MW required for complete carbon conversion is supplied to the process by means of an electrically operated graphite heater 58, 59. After completion of the carbon conversions, the process gas mass flow of 47.5 kg/s is convectively cooled by means of a plurality of quenching stages 13a, 13b in the C converter 7 to a temperature $T_{19}$ of 215° C., wherein a temperature section 87 between two quenching stages 13a, 13b is at a temperature $T_{18}$ of 301° C. Up to this temperature stage 87, the cooling rate is so high that reverse reactions in the reaction mixture at 1000° C. are largely inhibited.

This product or syngas 3 is cooled in the cooler 81 to a temperature $T_{20}$ of 136° C. and then supplied to the purification stage 82. The purified syngas 3 with a mass flow of 38.2 kg/s exiting said stage has the following composition:

| | |
|---|---|
| CO | 32.0 vol % |
| $CO_2$ | 1.8 vol % |
| $H_2$ | 64.0 vol % |
| $H_2O$ | 1.5 vol % |
| $CH_4$ | 0.7 vol % |

After the purification stage 82, the syngas 3 has a temperature $T_{21}$ of approx. 20° C. at a pressure of 20 bara. In the purification stage 82, water 88 is captured. Other energy-containing components 89 are further used energetically in other parts of the plant. A partial stream 3a of 1.07 kg/s of the syngas 3 as described above is recycled to the plasma generator 38 of the HC converter 2. The pressure of the main portion of the syngas 3 in increased by the high-pressure condenser 83 from 20 bara to 40 bara. In this process, the temperature $T_{22}$ increases to 96° C. In the above-described cooler 81 for the reaction mixture flowing from the C converter 7 or the syngas 3, it serves as a coolant, and its temperature $T_{23}$ is increased to 190° C.

For a special process in a subsequent Fischer-Tropsch (FT) reactor 14, a ratio of $H_2$ to CO of 2:1 is required, with this ratio having been achieved here. In this Fischer-Tropsch synthesis, 158 kJ/mol of reaction heat 90 is released at a temperature level $T_{24}$ of about 200° C. This heat can in turn be supplied to the process or be used in waste heat management for producing electrical energy. With respect to the above-referenced mass flows, an amount of heat of 172.3 MW is generated. In order to achieve a corresponding conversion in the Fischer-Tropsch process of 90% in this case, multiple systems are connected in series. After this, the HCs 91 produced are separated in a refinery 18 into fuel, liquid gas, or the like. In this process, a middle distillate 19 is produced having a composition of approx. 50% kerosene, 25% naphtha, and 25% diesel. This yields the following usable mass flows:

kerosene: 6.7 kg/s
diesel: 3.3 kg/s
naphtha: 3.3 kg/s
propane etc. 0.7 kg/s

Any further water 92 produced is discharged from the FT reactor.

As already mentioned in connection with FIG. 2, the HCs 93 separated in the refinery 18 from the middle distillate 19 can be partially recycled as educts into the HC converter 2.

In this special plant, the propane 94a produced in the refinery 18 and the small amounts of propane 94b produced in the FT reactor 14 are supplied to a burner 95 in which they are burned with atmospheric oxygen 96. The combustion heat is released in the heater 85 into the partial stream 3a of syngas 3, which is used as plasma gas in the HC converter 2 and enters said converter at a temperature of 450° C. The waste gas generated in the burner is discharged via a waste gas line 97.

From an energy standpoint, 800.2 MW of methane, a total of 277.7 MW of electricity, and 26.0 MW for gas purification are expended, and one obtains 305.7 MW of kerosene, 149.7 MW of diesel, 150.0 MW of naphtha, and 147.9 MW of propane. Looking at the cost-benefit ratio and taking into account a conversion rate of 60% in a power plant for the conversion of the chemical energy of methane to electrical energy, this yields an efficiency of 58.4% with respect to the chemical energies in question.

Several embodiments of the invention are summarized by the following:

Embodiment 1

Method for producing syngas, comprising the following steps: a) splitting of a hydrocarbon 1 into carbon 5 and hydrogen 6 using a plasma, b) mixing of steam 8 with at least a portion of the product obtained in a) having the main components carbon 5 and hydrogen 6, wherein a portion of the carbon 5 obtained by splitting is converted with the steam 8 to carbon monoxide and hydrogen, preferably at temperatures between 800° C. and 1700° C., c) mixing of carbon dioxide 9 with at least a portion of the product obtained in a) having the main components carbon 5 and hydrogen 6, wherein a portion of the carbon 5 obtained by splitting is converted with the carbon dioxide 9 to carbon monoxide, preferably at temperatures between 800° C. and 1700° C., d) supplying of heat 10 to each of the steps according to b) and c) in order to ensure the highest possible conversion of carbon 5, and e) quenching 13 of the product stream of steps b) and c), preferably to a temperature below 400° C.

Embodiment 2

Method for producing syngas according to embodiment 1, wherein the supply of steam 8 b) and carbon dioxide 9 c) can be carried out together, separately, or staggered.

Embodiment 3

Method for producing syngas according to embodiment 1 or 2, wherein supply of the heat 10 d) can be carried out by electric heating, but also by co-combustion of hydrocarbons.

Embodiment 4

Method for producing syngas according to one of the preceding embodiments, wherein the quenching 13 according to step e) can take place by injection of water 63, heat dissipation by means of an endothermic reaction, or heat transfer in a heat exchanger 64, wherein the temperature after the quenching 13 does not drop below the dew point temperature, provided that the quenching 13 is carried out with a heat exchanger 64.

Embodiment 5

Method for producing syngas according to one of the preceding embodiments, wherein the ratio of the products hydrogen and carbon monoxide can be controlled by means of the supply ratio of steam 8 to carbon dioxide 9.

Embodiment 6

Method for producing syngas according to one of the preceding embodiments, wherein a portion 3a of the produced syngas 3 that is recycled to the process, hydrogen, or inert gas can be used as plasma gas 43.

Embodiment 7

Method for producing syngas according to one of the preceding embodiments, wherein the preheating/vaporizing of the carbon dioxide 9 and/or the water 8 can take place by means of the sensible heat of the product flow from a).

Embodiment 8

Method for producing syngas according to one of the preceding embodiments, wherein the preheating/vaporizing of the carbon 5 and/or the water 8 can take place by means of the sensible heat of the syngas 3 (after the carbon conversion).

Embodiment 9

Method for producing syngas according to one of the preceding embodiments, wherein the preheating of the plasma gas 43 can take place by means of the sensible heat of the syngas 3 (after the carbon conversion).

Embodiment 10

Method for producing syngas according to one of the preceding embodiments, wherein a portion of the sensible heat of the syngas 3 is used for producing electrical energy 4.

Embodiment 11

Method for producing syngas according to one of the preceding embodiments, wherein step a) is carried out in a Kvaerner reactor or a modified Kvaerner reactor.

Embodiment 12

Method for producing syngas according to one of the preceding embodiments, wherein step a) is carried out in a high-temperature HC converter by means of plasma, preferably at over 1000° C.

Embodiment 13

Method for producing syngas according to one of the preceding embodiments, wherein step a) can take place simultaneously in a plurality of HC converters, and wherein one part can be configured as a high-temperature converter with working temperatures over 1000° C. and the other part can be configured as a low-temperature converter with working temperatures below 1000° C.

Embodiment 14

Method for producing syngas according to one of the preceding embodiments, wherein step a) can be carried out in one or a plurality of carbon converters 7 that can be operated with a working pressure of between 1 bar and 200 bar.

Embodiment 15

Method for producing syngas according to one of the preceding embodiments, wherein the hydrocarbons 1 in step a) are composed of a stream of natural gas, methane, liquefied gases, and/or heavy fuel oil, as well as conventional or non-conventional natural gas.

Embodiment 16

Method for producing syngas according to one of the preceding embodiments, wherein a portion of the produced carbon 5 in step a) is withdrawn from the method as activated carbon, graphite, carbon black, or other modifications such as carbon cones or carbon discs.

Embodiment 17

Method for producing synthetic functionalized and/or non-functionalized hydrocarbons, comprising the following step: g) production of synthetic functionalized and/or non-functionalized hydrocarbons from at least a portion of the syngas 3 that was produced in step c) of the method according to one of the embodiments 1 through 16.

Embodiment 18

Method for producing synthetic functionalized and/or non-functionalized hydrocarbons according to embodiment 17, wherein the production of hydrocarbons in step g) further takes place using at least a portion of the hydrogen 6 that was produced in step a) of the method according to one of the embodiments 1 through 13.

Embodiment 19

Method for producing synthetic functionalized and/or non-functionalized hydrocarbons according to embodiment 17 or 18, wherein a portion of the synthetic hydrocarbons produced in step g) is used as a supplied hydrocarbon in step a).

Embodiment 20

Method for producing synthetic functionalized and/or non-functionalized hydrocarbons according to one of the embodiments 17 through 19, wherein step g) of production of hydrocarbons takes place by means of a Fischer-Tropsch method, in particular by means of an SMDS method.

Embodiment 21

Method for producing synthetic functionalized and/or non-functionalized hydrocarbons according to one of the embodiments 17 through 19, wherein step g) of production of functionalized and/or non-functionalized hydrocarbons takes place by means of a Bergius-Pier method, a Pier method, or a combination of a Pier method with an Mtl method.

Embodiment 22

Method for producing synthetic functionalized and/or non-functionalized hydrocarbons according to one of the embodiments 17 through 21, wherein the functionalized and/or non-functionalized hydrocarbons produced in step g) comprise the following substances: paraffin, diesel fuels, gasoline fuels, kerosene, methanol, methane, liquefied gases.

Embodiment 23

Plant for producing syngas, comprising the following: a plasma-operated HC converter 2 with at least one inlet for a fluid containing a hydrocarbon, as well as at least one outlet for carbon and at least one outlet for hydrogen.

Embodiment 24

Plant for producing syngas, comprising the following: a plasma-operated HC converter 2 with at least one inlet for a fluid containing a hydrocarbon 1 and at least one common outlet for carbon 5 and hydrogen 6; a C converter (=carbon converter) 7 with at least one inlet for water 8, at least one inlet for carbon 5, and one inlet for carbon dioxide 9, as well as at least one outlet for syngas 3, wherein at least one inlet for carbon 5 of the C converter 7 is connected to an outlet for carbon 5 of the HC converter 2 by a C connection. In an alternative embodiment, the aforementioned reaction units are combined into one device 30. This results in at least one inlet for hydrocarbon 1, plasma gas 43, carbon dioxide 9, steam 8, and at least one outlet for the syngas 3. The inlets for hydrocarbons 1 and plasma gas 43 can alternatively be configured together.

Embodiment 25

Plant for producing syngas according to one of the embodiments 23 and 24, wherein the HC converter 2 comprises a converter operated with plasma torches 38, in particular a Kvaerner reactor or a modified Kvaerner reactor.

Embodiment 26

Plant for producing syngas according to one of the embodiments 23 through 25, wherein at least one outlet for removing a portion 5*a* of the produced carbon 5 that is not used in the C converter 7 for producing syngas 3 is present for use e.g. as activated carbon, graphite, carbon black, or another modification, such as carbon cones or carbon discs.

Embodiment 27

Plant for producing synthetic functionalized and/or non-functionalized hydrocarbons, comprising the following: a plant according to one of the embodiments 23 through 26; and a CO converter 14 with at least one inlet for syngas 3 and at least one outlet for synthetic functionalized and/or non-functionalized hydrocarbons 91, wherein at least one inlet for syngas 3 of the CO converter 14 is connected to an outlet for syngas 3 of the C converter 7.

Embodiment 28

Plant for producing synthetic functionalized and/or non-functionalized hydrocarbons according to embodiment 27, wherein the CO converter 14 comprises at least one inlet for hydrogen 6 that is connected to an outlet for hydrogen 6 of the hydrocarbon converter 2.

Embodiment 29

Plant for producing synthetic functionalized and/or non-functionalized hydrocarbons according to embodiment 27 or 28, wherein the CO converter 14 comprises a Fischer-Tropsch converter, in particular an SMDS converter.

Embodiment 30

Plant for producing synthetic functionalized and/or non-functionalized hydrocarbons according to embodiment 27 or 28, wherein the CO converter 14 comprises a Bergius-Pier converter, a Pier converter, or a combination of a Pier converter with an Mtl converter.

Embodiment 31

Plant for producing synthetic functionalized and/or non-functionalized hydrocarbons according to embodiment 27 or 28, comprising a plurality of CO converters 14, wherein the individual CO converters 14 comprise a Fischer-Tropsch converter, in particular an SMDS converter, or a Bergius-Pier converter, a Pier converter or a combination of a Pier converter with an Mtl converter.

Embodiment 32

Plant for producing synthetic functionalized and/or non-functionalized hydrocarbons according to one of the embodiments 27 through 31, wherein at least one outlet for synthetic functionalized and/or non-functionalized hydrocarbons 91 of the CO converter 14 is connected to an inlet for hydrocarbons 1 of the hydrocarbon converter 2.

The invention claimed is:

1. A method for producing syngas, the method comprising:
   a) splitting a hydrocarbon into carbon and hydrogen using a plasma to obtain a first product including carbon and hydrogen;
   b) mixing steam and carbon dioxide with at least a portion of the first product to produce a product stream, wherein a first portion of the carbon in the first product is converted in an endothermic reaction with steam to carbon monoxide and hydrogen and a second portion of the carbon in the first product is converted in another endothermic reaction with the carbon dioxide to carbon monoxide, wherein the mixing of the carbon dioxide takes place before the mixing of the steam and wherein heat is supplied to the endothermic reaction; and
   c) quenching the product stream of step b).

2. The method according to claim 1, wherein in step b), the heat is supplied by electric heating and/or co-combustion of hydrocarbons.

3. The method according to claim 1, wherein in step c), the product stream of step b) is quenched to a temperature at or below 400° C.

4. The method according to claim 1, wherein the quenching according to step c) is carried out by injection of water, heat dissipation by means of an endothermic reaction, or heat transfer in a heat exchanger wherein the temperature of the product stream after quenching does not drop below the dew point temperature.

5. The method according to claim 1, wherein a product ratio of hydrogen to carbon monoxide is regulated via a supply ratio of steam to carbon dioxide.

6. The method according to claim 5, wherein the product ratio of hydrogen to carbon monoxide is set in a range of 1.75:1 to 1.95:1.

7. The method according to claim 1, wherein in step b, the temperatures are in the range of 900° C. to 1500° C.

8. The method according to claim 1, wherein step a) is carried out in one or a plurality of hydrocarbon converters at a working pressure in the range of 1 bar to 50 bar.

9. The method according to claim 1, further comprising:
   d) production of synthetic functionalized and/or non-functionalized hydrocarbons from at least a portion of syngas formed in step c).

10. The method according to claim 9, wherein the functionalized and/or nonfunctionalized hydrocarbons comprise one or more of the following substances: paraffin, diesel fuels, gasoline fuels, kerosene, methanol, methane, liquefied gases.

* * * * *